Patented May 4, 1943

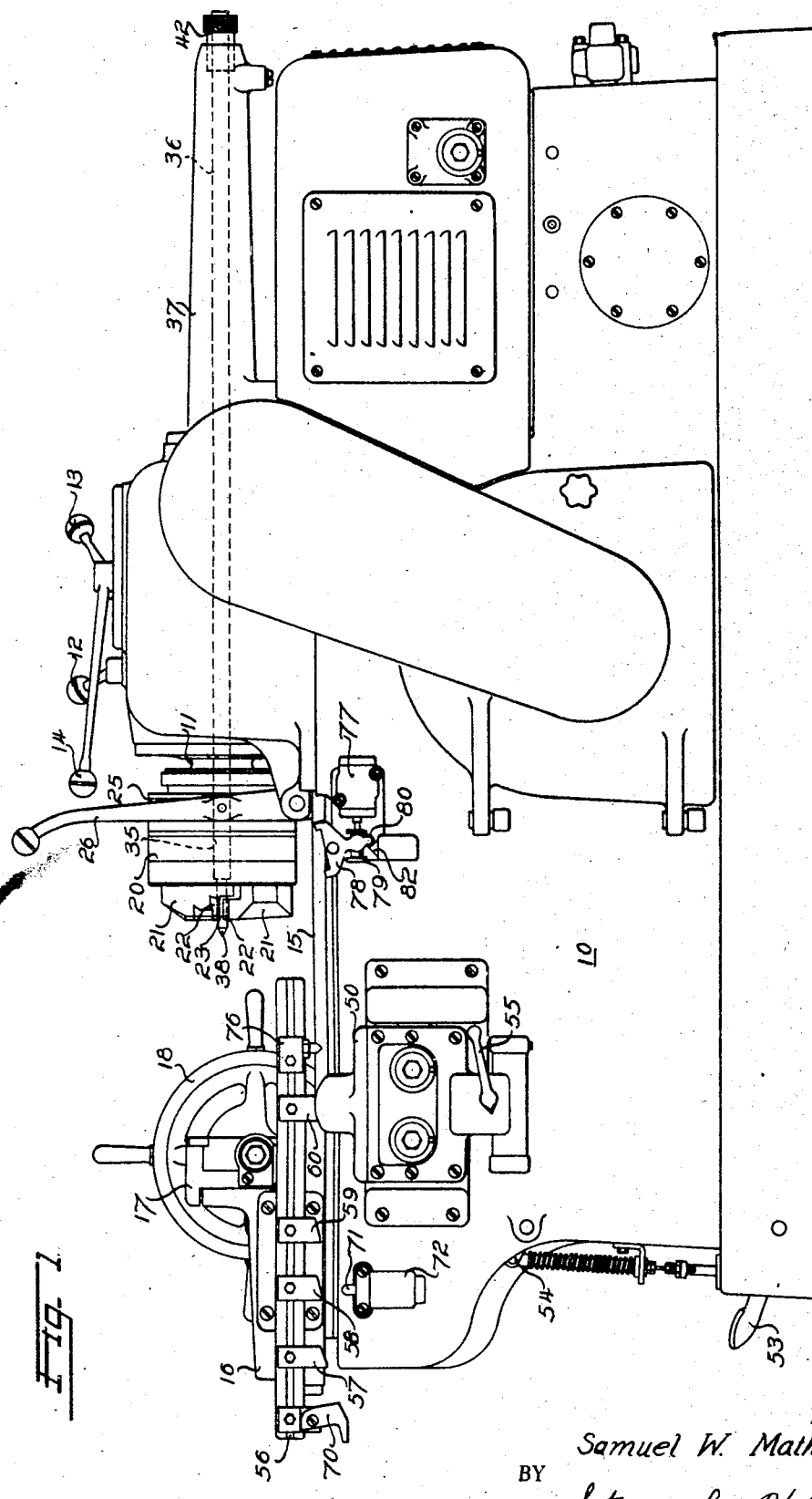

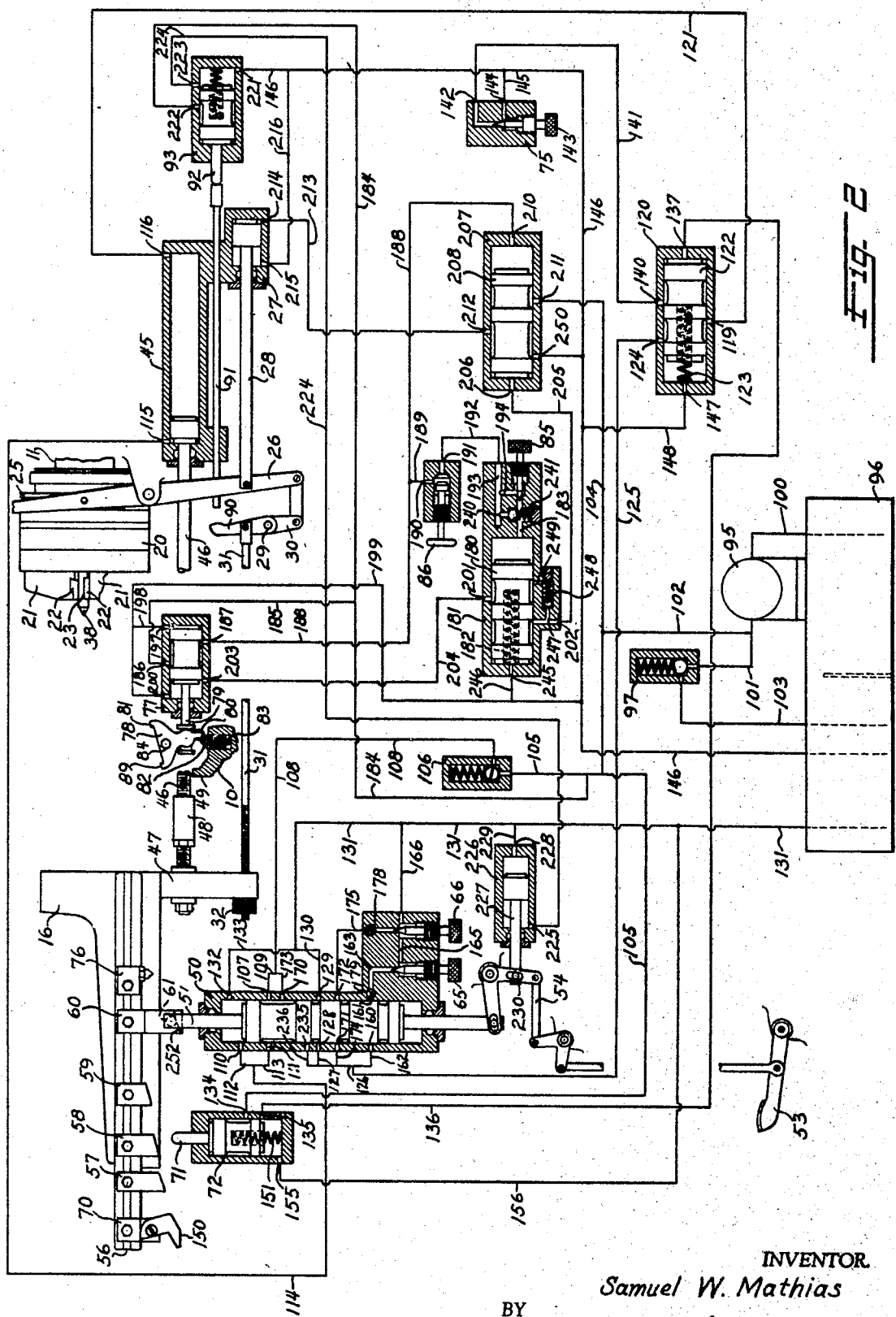

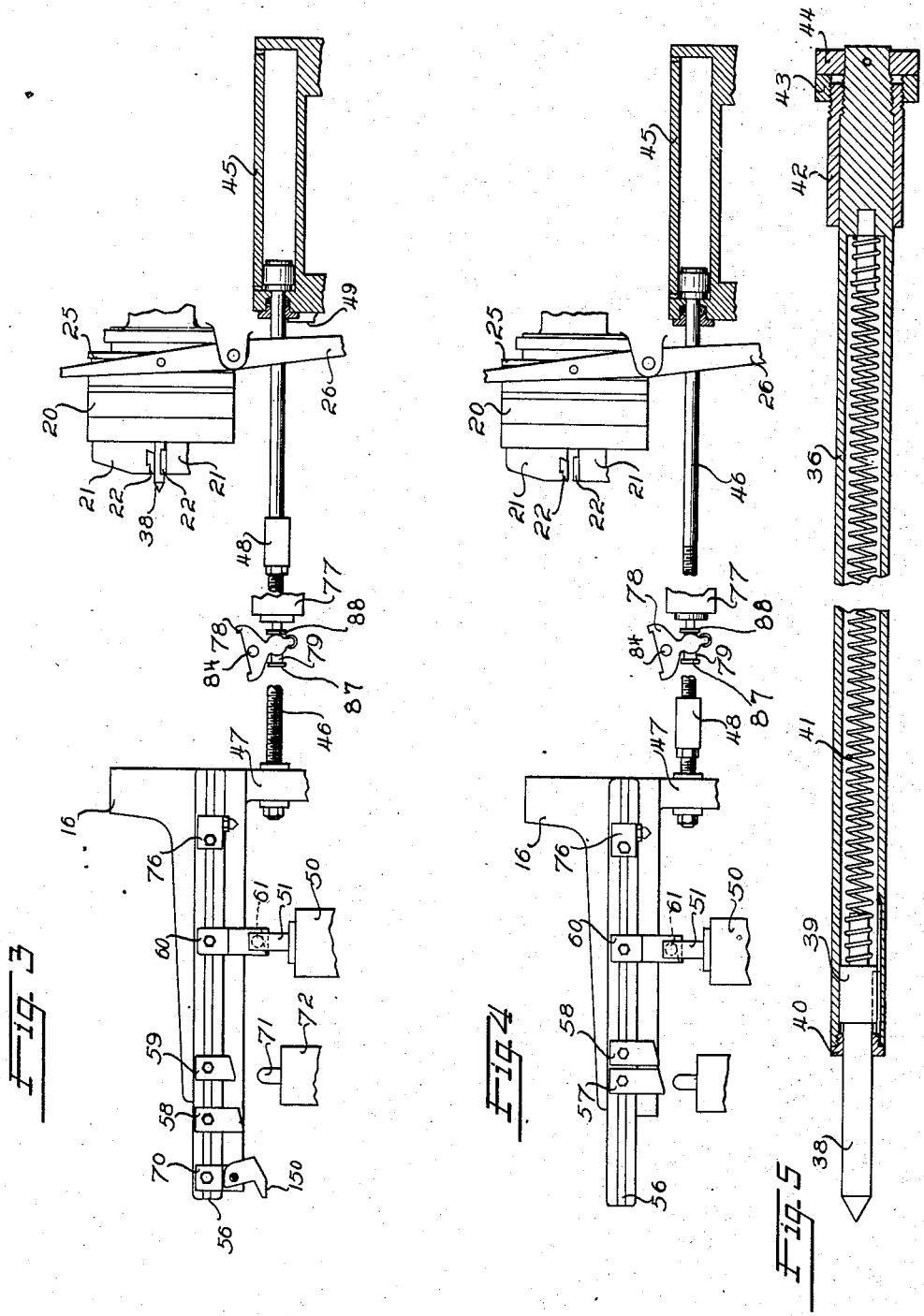

2,318,177

UNITED STATES PATENT OFFICE 2,318,177

HYDRAULICALLY OPERATED COMBINED THREADING AND TURNING MACHINE

Samuel W. Mathias, Waynesboro, Pa., assignor to Landis Machine Company, Waynesboro, Pa., a corporation of Pennsylvania Application August 3, 1940, Serial No. 351,012

19 Claims. (Cl. 10—87)

This invention relates to a combined threading and turning machine, more especially to a machine of this type which is hydraulically operated.

While both hydraulically operated threading machines and hydraulically operated turning machines have been known for many years, it has heretofore been considered impractical to devise a combined machine whose hydraulically actuated mechanisms could selectively be combined and utilized to perform their required functions equally well regardless of whether the machine was to be employed for threading or for turning, and in such manner as to have the performance thereof equal or superior to machines specifically designed for but one type of operation.

The inherent nature of hydraulically operated machines specifically adapted for turning generally has made them entirely unsuitable for threading operations, for such machines do not incorporate the exceedingly precise synchronism of relative axial and rotative movement between the cutting tool and the work required for threading operations. Neither are they capable of effecting the appreciably lower cutting feeds common to threading. Occasionally, a limited character of rather crude threading operations is performed on these machines, in which case changes of a makeshift character are made in the turning machines.

Likewise, the inherent nature of hydraulically operated threading machines generally has precluded their use for commercial turning operations, for the characteristics which specifically adapt them for threading largely are obtained at a sacrifice of the productivity normally expected of a machine which primarily is designed for turning.

My improved machine in its threading condition is capable of being used to effect an initial leadscrew motion between the work and the threading elements and subsequently to permit the latter to serve as their own leadscrew mechanism.

When the nature of the engagement between the work and the cutting elements or the nature of the axial cutting thrust forces preclude having the cutting elements function in such manner, as when very shallow or very coarse threads, respectively, are to be cut, the machine may be operated to effect a leadscrew motion during the entire threading operation. Furthermore, threads of widely varying forms, pitches, leads, lengths, and diameters may be cut with relatively equal ease. Still further, the machine may be modified to produce either external or internal, tapered, or straight threads.

In its turning condition, the improved machine is capable of either coarse or fine axial turning feeds or both in sequence. Further, it may be used to both turn and face the work which can be of widely varying lengths and diameters. Still further, my improved machine may be modified to produce either external or internal, straight, or tapered turned surfaces.

Other useful operations that may be performed therewith will be apparent to those skilled in the art.

Basically, the invention comprises a work carrying member, a tool carrying member, and a member supporting these two and incorporating a plurality of combined hydraulically actuated mechanisms for effecting various types of desired axial movement between the work carrying and the tool carrying members. Novel hydraulically actuated means are provided for effecting relative axial work and tool movement, one of the unique features being the fact that the initial rapid forward movement of the carriage to operating position may be interrupted and the movement of the carriage slowed or retarded to provide a work chucking period, during which period certain types of work may be centered on both the work carrying and tool carrying machine members. After such chucking has been effected, the rapid forward movement of the carriage may be resumed so as to minimize the non-cutting portion of the entire cycle. Since the duration of this delayed chucking period can be controlled at will by the operator, and since its timing within the rapid work positioning portion of the cycle can be established to suit widely varying lengths of work, the useful scope of this feature is greatly enhanced.

In a preferred embodiment, the present disclosure comprises a tool carrying member which is rotatably mounted on the machine frame and which may be of the type disclosed in United States Patent 1,760,568, utilizing tool assemblies of the general type disclosed in United States Patent 1,738,847. The work carrying member is slidably mounted on the machine frame and is essentially similar to that disclosed in my copending application Serial No. 199,527, filed April 1, 1938, which has matured into Patent No. 2,215,270, of Sept. 17, 1940. As such, the machine would best be adapted for the external threading of straight threads; or by substituting plain cutters for the thread-cutting elements and effecting minor adjustments of the operation of the hydraulically actuated mechanisms, it would equally well be adapted for the turning of cylindrical surfaces. Further, both tapered threads and conical surfaces may, respectively, be threaded or turned thereby, providing that suitably tapered cutting elements of the correct cutting configuration are employed and that the length of threaded or turned surface does not exceed the permissible length of engagement between the cutters and the work.

In a further embodiment of the invention, external cutting tools, of the type disclosed in United States application Serial No. 268,966, filed April 20, 1939, which has matured into Patent No. 2,291,919, of Aug. 4, 1942, or the rotary pull-off type tool disclosed in United States Patent 2,154,006, may be rotatably mounted on the machine to cut external threads and for turning purposes. Further, should it be desired to produce externally threaded or turned surfaces having a generated taper, a mechanism of the type disclosed in copending application Serial No. 350,811, filed on even date herewith, which has matured into Patent No. 2,291,758, of Aug. 4, 1942, may be employed.

My improved machine may also be arranged for internal straight threading and turning by utilizing a rotary type tool of the character disclosed in copending application Serial No. 327,731, filed April 4, 1940, which has matured into Patent No. 2,283,280, of May 19, 1942. Further, both tapered internal threads and tapered bores may be produced therewith by using suitably tapered cutting elements of the correct cutting configuration when the length of threaded or bored surface does not exceed the permissible length of engagement between the cutters and the work. Likewise, a fully generated internal tapered thread or bore may be produced by utilizing a tool of the character disclosed in United States Patent 2,054,029.

In further embodiments of the invention, the work may be rotatably mounted on the carriage member, while cutting tools of the types shown in the aforementioned patents and applications may be mounted on the machine frame. These same tools may be rotatably mounted on the carriage member, while the work may be held by a yoke operated chuck carried by the machine frame. These same tools may also be mounted on the carriage member, while the work may be held and rotated by a rotatable yoke operated chuck carried by the machine frame.

It is a primary object of my invention to provide a hydraulically operated combined threading and turning machine which is adaptable for a wide variety of turning and threading operations by means of adjustments of its normal complement of machine units.

It is another major object of my invention to provide an improved automatic combined universal threading and turning machine which is adaptable to a wide variety of threading or turning operations.

A further important object is to provide a machine with hydraulically actuated means causing an initial rapid relative axial movement between the work holder and the cutting elements to minimize the time of non-productive operation of the machine, which rapid movement may automatically be retarded to permit a delayed centering and chucking of the work.

It is another object of my invention to provide a quick acting operating mechanism for one of the hydraulic control elements whereby the cutting elements are quickly disengaged from the work at the end of a cutting operation.

Further objects will become apparent from the following specification and the accompanying drawings, and from the appended claims.

In the drawings:

Figure 1 is a front elevation of a preferred embodiment of my invention, the tool carrying member comprising a cutter head which is rotatably mounted in the machine frame and the work carrying member comprising a clamping device which is mounted on an axially slidable carriage that is adapted to undergo various controlled axial movements determined and effected by a combination of automatically actuated mechanism mounted on the carriage and the machine frame.

Figure 2 is a schematic diagram of the automatically actuated mechanisms and their connections with each other and with the work carrying and the tool carrying members.

Figure 3 is a partial view showing the automatically actuated mechanisms disposed to effect a typical turning operation.

Figure 4 is a partial view showing the automatically actuated mechanisms disposed to effect a typical threading operation.

Figure 5 is a partial sectional view showing details of the spring pressed center assembly construction.

Referring to Figure 1, the machine comprises a frame 10 which has mounted therein a motor (not shown) and change speed and reverse gearing (not shown) for driving a tool spindle 11 that is rotatably mounted in frame 10. Levers 12 and 13 are used to effect changes of the rotative speed of spindle 11, and lever 14 is used to effect reversals of the direction of spindle rotation. Frame 10 further is provided with slideways 15 on which is axially slidably mounted a carriage 16, preferably one of the type incorporating a full-centering carriage front 17 combined with a quick-acting clamping device 18 as is disclosed in my copending application Serial No. 199,527, filed on April 1, 1938.

Mounted on tool spindle 11 is a cutter head 20, the one shown being of the same general type as that disclosed by Shearer in United States Patent 1,760,568 and incorporating cutter assemblies 21 of the type further disclosed by Shearer in United States Patent 1,738,847, which assemblies employ cutters 22 whose cutting edges 23 are tangentially disposed to the work and may be plain, for turning, or serrated, for producing a desired form of thread.

Referring to Figures 1 and 2, cutter head 20 incorporates an operating ring 25 which is adapted to be actuated by a yoke mechanism 26, pivotally mounted on frame 10, to effect disengagement of cutters 22 from the finished work and to effect a resetting of the cutters to operating position. The manner in which the yoke mechanism and the operating ring coact for these purposes is well known to those skilled in the art and is fully described in United States Patent 1,760,568.

To actuate yoke mechanism 26 for moving operating ring 25 to disengage cutters 22, a hydraulic motor 27 is connected by piston rod 28 to the yoke mechanism 26. The resetting movement of the yoke mechanism is adapted to be effected by a mechanical linkage 30, pivoted to the frame at 29 and connected to the yoke. A rod 31 connected to the linkage has thereon adjustable abutments 32 that are contacted by carriage 16 to actuate rod 31 and linkage 30, rod 31 being slidable in the carriage.

Referring more particularly to Figures 1 and 5, cutter head 20 further incorporates a central bore 35 in which is mounted a non-rotatable sleeve 36 carried by a rearwardly extending housing 37 which forms part of frame 10. Axially movably keyed within sleeve 36 is a center 38 having an enlarged annular portion 39 adapted to contact the end surface of a ring 40 threaded into the forward end of sleeve 36, being pressed thereagainst by a spring 41 located within sleeve 36 and abutting the rear portion of center 38.

Sleeve 36 may be longitudinally adjusted, with respect to the housing 37, by rotating it with respect to the means 42 which has a force fit in the end of housing 37 and an internal thread engaging a cooperating thread on the end of sleeve 36. A collar 44 is pinned to sleeve 36 and provides means for turning the sleeve within the means 42. A locking nut 43 is also threaded on means 42 and serves to lock sleeve 36 in adjusted position by frictional engagement with the collar 44 which is pinned to the sleeve. The center may thereby be positioned more or less forward of cutter assemblies 21 to facilitate the centering of different types of work.

A hydraulic motor 45 is utilized to effect axial movements of carriage 16, having a piston rod 46 which is connected to a depending lug 47 of the carriage. Adjustably mounted on rod 46 is a collar 48 adapted to contact a fixed abutment 49 of frame 10 to limit the axial movement of carriage 16 toward cutter head 20.

A main control valve 50 is mounted on frame 10 and has a plunger 51 mounted therein to be disposed in any of a plurality of control positions. A foot treadle 53 is mounted on frame 10 and is connected by linkage mechanism 54 to plunger 51, being used to position plunger 51 for starting the cycle of machine operations. Further, a hand-operated mechanism 55 of a common type may be employed to effect manual displacements of plunger 51 to any of its control positions, the position of the plunger for various positions of the hand-operated mechanism being suitably indexed.

For effecting such plunger displacements automatically, carriage 16 is provided with a longitudinal T-slot 56 adapted to receive a plurality of dogs 57, 58, 59 and 60, which are adjustably clamped therein and removable therefrom and which during the operation of the machine coact with a roller 61 carried by plunger 51 to depress or raise the plunger to different control positions.

Main control valve 50 has associated therewith a valve 65 for determining the rate of coarse axial work feed and a second valve 66 for determining the rate of fine axial work feed. Both of these valves are adjustable, being set by the machine operator.

A dog 70 is adjustably positioned in T-slot 56 to coact with spring pressed plunger 71 of a valve 72. This valve serves as a means for interrupting the normal rapid initial movement of carriage 16 toward cutter head 20, whereupon the carriage proceeds with a retarded movement to permit centering the work on the center 38. As will be described later, a manually adjustable valve 75 is utilized to determine the speed of the retarded carriage movement.

T-slot 56 further is provided with a dog 76 which is adapted to actuate a quick-acting valve 77 that serves as a hydraulic trip for actuating hydraulic motor 27 to effect a cutter disengaging operation of yoke mechanism 26. To effect quick actuation of valve 77, dog 76 is adapted, during the motion of carriage 16, to engage an abutment 81 on rocker 78. The rocker is rockably mounted on the frame 10 at the pivot 84 and is slidably engaged between shoulders 87 and 88 on the valve stem 79. The lower end of rocker 78 carries a roller 80 which cams with a conically pointed detent 82 slidably mounted in frame 10 directly below pivot 84 and having a spring 83 therein to maintain it in camming contact with the roller 80. Thus, as dog 76 in its motion engages and rotates rocker 78 in a clockwise direction, roller 80 thereof depresses detent 82 against the action of spring 83. As roller 78 rides across the top of the cone point of detent 82, spring 83 serves to effect a rapid camming therebetween to cause rocker 78 to have a snap action clockwise movement. Since the rocker is engaged between shoulders 87 and 88 the snap action of the rocker will move the valve stem 79 to the left with a similar snap action. There is a certain amount of lost motion between the shoulders 87—88 and the rocker so that the valve stem will not be moved while the rocker 78 is moving slowly and depressing the detent 82 before the snap action occurs.

When it is desired to face a shoulder on turned work, valve 77 is further adapted to be connected to a valve 85 that is manually adjustable to delay the operation of the hydraulic motor 27, whereby cutters 22 can engage a face of the work to finish the same before they disengage therefrom and whereby tool marks, such as those commonly formed at the end of a cut, may be removed from the turned surfaces of the work. A manually operated cut-out valve 86 is provided for connecting and disconnecting valve 85 from valve 77.

As hydraulic motor 27 effects cutter disengaging motion of yoke mechanism 26, it also actuates linkage 30 to have member 90 thereof contact a rod 91 to depress a plunger 92 of a valve 93 which valve, by means of hydraulic connections to be later described, serves to move plunger 51 of the main control valve 50 to carriage return position.

A pump 95 is provided to draw exhaust fluid from a return tank 96 to introduce it back into the circuit as high pressure fluid. A by-pass relief valve 97 discharges fluid back into the tank 96 if the pressure on the discharge side of the pump becomes too great.

Other auxiliary mechanisms, connections and valves are incorporated in the circuit, and these will be described during the description of the operating cycles of the machine.

*Turning operation*

Referring now to Figure 3, the dogs 70, 58, 59, and 76 are disposed in T-slot 56 of carriage 16 to control a typical turning operation. This operation includes centering the work, making a coarse and a subsequent fine turning cut, and facing a work shoulder when the relative axial movement between the work and cutters 22 has been stopped by the engagement of collar 48 with the frame abutment 49. Cut-out valve 86 will be open as shown in Figure 2, to permit of carriage delay for shoulder facing, and valves 75, 65, 66, and 85 will have been adjusted to regulate, respectively, the chucking feed, the coarse axial feed, the fine axial feed, and the facing time period.

*Rapid carriage advance*

Referring to both Figures 2 and 3, when the operator depresses the foot treadle 53, plunger 51 of control valve 50 is moved upwardly to cycle starting position. Pump 95 draws fluid from tank 96 through line 100 and directs high pressure fluid out through line 101 and connecting line 102. By-pass relief valve 97, connected to line 101, permits any excess fluid to return to tank 96 through line 103.

The high pressure fluid in line 102 flows through connecting lines 104 and 105 to check valve 106, whose purpose later will be explained. The fluid leaves valve 106 and is directed to port 107 of control valve 50 by lines 108 and 109. At this time port 107 is open to ports 110 and 111; thus the fluid passes out of these ports through lines 112 and 113, respectively, which connect with line 114 that directs the fluid to port 115 of hydraulic motor 45 to effect rapid movement of piston rod 46 to the right, whereby carriage 16 is rapidly pulled toward cutter head 20.

Piston rod 46 is permitted to move rapidly to the right, since the exhaust from motor 45 can flow freely back to tank 96, as follows. Exhaust fluid leaves motor 45 through port 116 and is directed by line 121 to port 119 of valve 120. Valve 120 contains a plunger 122 which is constantly urged to the right by spring 123. At this time, plunger 122 is in its rightmost position, which permits the exhaust fluid to flow from port 119 out through port 124 to line 125. Line 125 directs the exhaust fluid to feeder line 126 from which it flows through line 127 to port 128 of control valve 50. With control valve 50 still in cycle starting position, port 128 is open to port 129, the exhaust fluid leaving valve 50 through that port and flowing out through line 130 and connecting line 131 to tank 96.

It is to be noted that any fluid entrapped in the upper end of valve 50 can exhaust to tank 96 through port 132 and line 133 which connects with line 131 that leads to tank 96. Thus, the upward movement of plunger 51 to cycle starting position is not hindered.

Centering and chucking

As carriage 16 approaches cutter head 20, the rapid rightward movement thereof is retarded to permit centering the work between clamping device 18 and spring pressed center 38 and chucking the same. Such carriage retardation is effected by restricting the flow of exhaust fluid from port 116 of motor 45. It is to be noted that the initial rapid advance of carriage 16 brings dog 70 into camming contact with the upwardly protruding portion of plunger 71 of valve 72. The space above the plunger in the valve body is suitably vented to allow movement of the plunger. As plunger 71 is depressed, high pressure fluid in line 104 is permitted to flow through line 105 to port 134 by valve 72 and out through port 135, plunger 71 being depressed at this time. The fluid then passes through line 136 which directs it to port 137 of valve 120. The pressure of this fluid against the end of plunger 122 of valve 120 is such as to move the plunger leftwardly against the force of spring 123. It should be noted that any fluid entrapped in the left end of valve 120 may flow out through port 147 thereof through line 148 and connecting line 146 to tank 96 as plunger 122 is moved leftwardly. With the plunger 122 now in its leftmost position, exhaust fluid from port 116 of motor 45 is permitted to flow through line 121 to port 119 of valve 120 and out through port 140 thereof to line 141 which directs it to port 142 of valve 75.

Valve 75 has a manually adjustable valve stem 143 which restricts the flow of exhaust fluid from port 142 to port 144 thereof. The restricted flow of exhaust fluid is directed from port 144 to line 145 and connecting line 146 which directs it back to tank 96.

It should be noted that the position of dog 70 within T-slot 56 of carriage 16 determines the instant at which such carriage retardation commences. Likewise, the setting of valve stem 143 determines the rate of carriage movement during the retarded period. The rate of carriage movement during the retarded period, together with the length of camming face 150 of dog 70, establishes the time period for centering and chucking the work, the duration of which period is preferably set by adjustments of valve stem 143, the length of camming face 150 of dog 70 preferably being standardized.

Resuming rapid carriage advance

Certain types of work are necessarily centered and chucked while still disposed a considerable distance forward of the cutter head 20. Consequently, to minimize the time required to bring the work into engagement with the cutters 22, the rapid carriage advance is resumed; that is, at the end of the centering and chucking period, the carriage 16 again is pulled rightwardly at the same rate it experienced during the initial rapid rightward movement thereof.

This is effected by having camming face 150 of dog 70 lose its engagement with the protruding portion of plunger 71 of valve 72 as the carriage moves to the right, whereupon a spring 151, within valve 72, forces plunger 71 upwardly to its former position to thereby block port 134 of valve 72 and to open port 135 to port 155 thereof. Since port 155 is connected to tank 96 by line 156 and connecting line 131, spring 123 in valve 120 now can move plunger 122 rightwardly, the fluid in the right-hand end of valve 120 exhausting out through port 137 through line 136 to port 135 of valve 72, through port 155 thereof and to tank 96 by line 156 and connecting line 131.

Thus, port 119 of valve 120 again is open to port 124 thereof, and exhaust fluid from motor 45 flows out to tank 96 as has previously been described in the description of the rapid carriage advance phase of the cycle.

Coarse axial feed

As carriage 16 approaches cutter head 20, and just before the work is engaged by cutters 22, the continuing rightward movement of the carriage causes dog 59 to coact with roller 61 to depress plunger 51 of main control valve 50 to coarse axial feed position. In this position of plunger 51, ports 107 and 111 still are open to each other and port 160 now is open to port 161, the remaining ports of valve 50 being blocked.

High pressure fluid continues to flow from port 107 to port 111 and to port 115 of motor 45 through line 113 and connecting line 114. Likewise, the exhaust from motor 45 continues to flow from port 116 thereof, through valve 120 and to feeder line 126, as is described under the description relating to the rapid carriage advance phase of the cycle.

Feeder line 126 now directs the exhaust fluid from motor 45 to line 162 which connects with port 160 of valve 50. The exhaust fluid passes to port 161 and out to duct 163 around manually-regulated coarse feed adjustment valve 65 and through duct 165, line 166, line 131, and into tank 96.

It is apparent that the setting of valve 65 determines the rate of coarse axial feed and that dog 59 can be adjustably positioned in T-slot 56 of carriage 16 to cause this feed action to start immediately upon or prior to the engagement of cutters 22 with the work.

Fine axial feed

As has been stated previously, the arrangement shown in Figure 3 is employed for a turning cycle which has a coarse axial feed phase and a subsequent fine axial feed phase. Such subsequent fine axial feed would be desirable when a superior finish would be required on the end of the work that is nearest to clamping device 18. Or, the cutters 22 may have their cutting edges 23 formed to progressively turn a plurality of progressively enlarged work diameters and the latter of these may require a fine finish.

As the coarse axial feed phase of the turning cycle nears completion, the continued rightward movement of carriage 16 causes dog 58 to depress plunger 51 of main control valve 50 to fine axial feed position. In this position of control valve 50, ports 107 and 170 both are open to port 111, and port 171 is open to port 172, the remaining ports being blocked.

High pressure fluid flows from line 108 to port 111 by passing through line 109 and port 107 and simultaneously through line 173 and port 170. The manner in which this high pressure fluid leaves port 111 to actuate motor 45 and the manner in which exhaust fluid from motor 45 returns to feeder line 126 is described in the description relating to the rapid carriage advance phase of the cycle.

Exhaust fluid is directed from feeder line 126 to port 171 by line 174. This fluid passes through port 172 to line 175 and subsequently to duct 176 which directs it around manually-regulated fine axial feed adjustment valve 66 from which it passes, by duct 165 to line 166 and line 131 into tank 96.

Obviously, valve 66 may be set to effect different desired rates of fine axial feed and dog 58 may be adjusted to have this feed commence at any desired time after the start of the coarse axial feed phase of the cycle.

Further, should the character of the work, etc., tend to produce fluctuations in the rate of volume of exhaust fluid leaving port 116 of motor 45, a common type of automatic volume rate stabilizing mechanism 178 (represented schematically in Figure 2) can be associated with valve 66 so that the fluid flow therethrough does not falter; likewise, a similar mechanism 179 (also represented schematically in Figure 2) can be associated with valve 65 for the same purpose.

Facing

As carriage 16 nears the end of its fine axial feed movements, dog 76 starts to rotate rocker 78 clockwise to cause plunger 79 of valve 77 to be moved leftwardly. At the instant when roller 80 of rocker 78 experiences the fast camming movement caused by the upward movement of spring pressed detent 82, collar 48 on piston rod 46 of motor 45 contacts frame abutment 49 to stop the rightward movement of carriage 16.

The cutters 22 of cutter head 20 now are wiping the turned surfaces of the work so as to remove any tool marks and can serve to face shoulders located on the work.

Prior to the leftward movement of plunger 79 of valve 77, high pressure fluid is pressing plunger 180 to the left-hand end of valve 181 against the force of spring 182. This is possible because of the fact that the high pressure fluid in line 105 is open to duct 183 of valve 181. Note that line 184 connects with line 105 and also with line 185 leading to port 186 of valve 77. This port is open to port 187 when valve plunger 79 is in its rightmost position. Line 188 leads from port 187 to line 189 that connects with port 190 of cut-out valve 86. Valve 86 is in open position so that port 190 is open to port 191 thereof. Line 192 leads from port 191 to duct 193 of valve 181; and duct 193 is connected to duct 183 by duct 194 of valve 181.

Now, the leftward movement of plunger 79 of valve 77 opens port 187 to port 197 so that the fluid in the right-hand end of valve 181 can be displaced to tank 96 by rightward movement of plunger 180, as effected by spring 182. For returning the fluid to tank 96, port 197 is connected by line 198 to line 199 which connects with line 146 that leads to tank 96. Further, any fluid entrapped in the left-hand end of valve 77 can flow to tank 96 by passing out through port 200 which connects with line 199.

Since manually-regulated facing time period adjusting valve 85 is disposed between duct 183 and duct 194, the position of this valve determines the rate at which the fluid in the right-hand end of valve 181 can exhaust to tank 96. Consequently, valve 85 determines the total time required for plunger 180 to be moved by spring 182 to the right-hand end of valve 181, which time elapse, as later will be evident, is the time period during which facing of the work can be effected. Further, since valve 85 is adjustable, the length of facing time period is adjustably established thereby.

Cutter head opening

As spring 182 gradually forces plunger 180 of valve 181 rightwardly at the rate permitted by the setting of valve 85, the plunger 180 eventually reaches its rightmost position. Port 201 of valve 181 now is open to port 202 thereof.

Since the leftward displacement of plunger 79 of valve 77 has opened port 186 to port 203, high pressure fluid flows from port 186 through port 203 and line 204 to port 201 of valve 181. It continues through port 202 and line 205 to port 206 of valve 207 and causes valve plunger 208 to be moved rightwardly. The fluid entrapped in the right-hand end of valve 207 can flow to tank 96 by passing out through port 210 and line 188 to port 187 of valve 77 whose plunger 79, being in its leftmost position, has opened port 187 to port 197 which is connected to tank 96 by lines 198, 199 and 146.

With plunger 208 of valve 207 now in its rightmost position, port 211 is open to port 212. High pressure fluid from line 104 now can flow from port 211 through port 212 and line 213 to port 214 of motor 27, whose piston rod 28 then is forced leftwardly. Any fluid entrapped in the left-hand end of motor 27 flows to tank 96, passing out port 215 and line 216 to line 146 leading to tank 96.

Since leftward movement of piston rod 28 causes yoke mechanism 26 to move operating ring 25 rearwardly on cutter head 20, the cutters 22 are caused to disengage from the finished work. Likewise, since such leftward movement of piston rod 28 does not occur until plunger 180 of valve 181 has reached its rightmost position and since the setting of valve 85 establishes the time required to effect such positioning of plunger 180, as has been mentioned previously, valve 85 forms the means to determine the time period of the facing phase of the cycle.

Rapid carriage return

As piston rod 28 of valve 27 moves leftwardly to actuate yoke mechanism 26, the member 90 of linkage 30 also is actuated to press rod 91 rightwardly. Rightward movement of rod 91 presses plunger 92 of valve 93 to the right against the force of spring 220. Any fluid entrapped in the right-hand end of valve 93 passes out port 221 thereof to line 146 which leads to tank 96.

When plunger 92 is in its rightmost position, port 222 is open to port 223. High pressure fluid now can flow from line 184 through ports 222 and 223 to line 224 which leads to port 225 of hydraulic motor 226 and piston rod 227 of motor 226 will be moved to the right. Any entrapped fluid in the right-hand end of motor 226 passes out port 228, line 229, line 131 and into tank 96.

Since piston rod 227 has a camming connection 230 with linkage mechanism 54, the rightward movement of piston rod 227 causes plunger 51 of main control valve 50 to be moved further downwardly.

As plunger 51 moves downwardly, it eventually assumes a position in which port 110 is open to port 132, ports 107 and 170 still are open to port 111, and port 128 is open to port 129. This normally is the stop position. At this time high pressure fluid from line 105 then can flow through valve 106, through line 108, and simultaneously through line 109 and port 107 and line 173 and port 170 to port 111 and out to line 113, then through line 112 to port 110, through which it passes to port 132 and out to tank 96 by lines 133 and 131. The pressure in the system beyond valve 106 drops to a low valve since it flows unrestrictedly into the tank. The valve 106, however, due to the action of a spring against a ball seating on the inlet port, maintains a sufficiently high pressure in lines 184 and 224 leading to motor 226 to continue to move plunger 51 of valve 50 further downwardly until it assumes carriage return position.

In carriage return position of plunger 51, port 110 is open to port 132 and port 170 is open to port 235, the remaining ports being blocked. Consequently, the pressure in the system again rises, and high pressure fluid flows through valve 106 to line 108 and line 173, which lead to port 170 that is open to port 235. The high pressure fluid then leaves port 235 by line 236, feeder line 126 and line 125 to flow to port 124 of valve 120. Since port 124 is open to port 119, the fluid flows therethrough and through line 121 to port 116 of motor 45 to start the rapid return of carriage 16, which is pushed leftwardly by the piston rod 46 of motor 45. The entrapped fluid in the left-hand end of motor 45 is exhausted to tank 96 by passing out port 115 and line 114, to line 112, and to port 110. Since port 110 now is open to port 132, the exhaust fluid from motor 45 continues through port 132, line 133, and line 131 to tank 96. This unrestricted flow of the exhaust from motor 45 permits of rapid carriage return.

As the carriage 16 starts its return movement, dog 76 engages abutment 89 on rocker 78 to impart a counter-clockwise snap action to rocker 78 due to the action of spring pressed detent 82. Rocker 78 snaps plunger 79 of valve 77 back to its rightmost position in valve 77. The entrapped fluid in the righthand end of valve 77 flows to tank 96 through port 197 and lines 198, 199 and 146.

With plunger 79 again in its rightmost position, port 186 is open to port 187 and port 200 is open to port 203. High pressure fluid flows from line 184 to line 185 to port 186 and out through port 187 and line 188 to port 210 of valve 207 to move plunger 208 back to its original position in the left-hand end of valve 207. The entrapped fluid in the left-hand end of valve 207 passes out through port 206, through line 205 to port 202 of valve 181. As will later be evident, it flows on to tank 96.

Simultaneously high pressure fluid from line 188 flows through line 189 and ports 190 and 191 of valve 86 to line 192 which connects with duct 193 of valve 181. The fluid passes from duct 193 into duct 240 and through check-valve 241 into duct 183 of valve 181 to again force plunger 180 to its original position in the left-hand end of valve 181. Duct 240 and check valve 241 are provided so that no delay is experienced in moving plunger 180 leftwardly, as would be the case if the fluid had to enter duct 183 through the restricting valve 85. The check valve 241 further prevents flow from duct 183 to duct 193 so that exhaust fluid from valve 181 must pass around valve 85 during the facing time delay period previously described.

The fluid entrapped in the left-hand end of valve 181 flows freely to tank 96, this end of the valve having a port 245 that is connected to line 246 which directs the exhaust fluid to line 199, and thereupon to line 146 leading to tank 96.

With plunger 180 of valve 181 again in its leftmost position, the exhaust fluid from the left-hand end of valve 207 flows from port 202 of valve 181 to duct 247 and past check valve 248 to port 249 which now is open to port 201. This exhaust fluid leaves port 201 by line 204 and is directed to port 203 of valve 77, thence to port 200, line 199, line 146, and into tank 96. Check valve 248 prevents any flow of high pressure fluid from port 201 of valve 181 to port 206 of valve 207 by way of port 249 and duct 247 of valve 181 during the facing time phases of cycle operation. Such flow must be from port 201 to port 202, and occurs only after plunger 180 of valve 181 has moved to the rightmost position to connect ports 201 and 202.

Thus, valves 77, 181, and 207 again are now in their original positions for the start of the next cycle which will begin when foot treadle 53 is actuated again.

Cutter head resetting

As carriage 16 approaches the end of its return movement, depending portion 47 thereof contacts adjustable abutments 32 on rod 31 of linkage 30 to actuate yoke mechanism 26 so as to move operating ring 25 of cutter head 20 forwardly to cause cutters 22 to be reset to their cutting position for the next cycle.

Since this movement of the yoke mechanism causes piston rod 28 of motor 27 to be moved to the right, this motor again is back in its initial position. Entrapped fluid in the right-hand end of motor 27 can flow out to tank 96 by passing out through port 214 and line 213 to port 212 of valve 207 and on through port 250 to line 146 leading to tank 96.

The leftward movement of rod 31 of linkage 30 also causes member 90 to rotate out of engagement with rod 91 which is holding plunger 92 of valve 93 in its rightmost position against the force of spring 251. Spring 251 now moves plunger 92 to the left, whereby the flow of high pressure fluid from port 222 to port 223 and on to motor 226 is stopped, port 222 again being blocked as it formerly was.

Simultaneously with these above-mentioned operations, camming face 252 of dog 60, which dog is carried by T-slot 56 of carriage 16, engages roller 61 of plunger 51 to move it into stop position, which position has been described under the description relating to the carriage return phase of the cycle. The fluid from pump 95 now is completely by-passed by valves 97 and 106; and, since motor 226 now cannot actuate plunger 51 because the plunger 92 of valve 93 is no longer depressed to permit high pressure fluid to reach motor 226, pump 95 remains in by-passed relation to the remainder of the circuit until the operator again depresses foot treadle 53 to start a new cycle.

Turning cycle variations

It is evident that when work not requiring mounting on centers is to be turned, it may be clamped in clamping device 18 prior to the start of the turning cycle, and dog 70 may be removed from T-slot 56 of carriage 16 to eliminate any centering and chucking period. Carriage 16 will then go from initial rapid advance to coarse axial feed motion without experiencing any reduced forward motion as required for centering and chucking.

Likewise, either coarse axial feed motion or fine axial feed motion may alone be used for the turning period. For coarse axial feed, dog 59 is retained in T-slot 56 and dog 58 is removed; while for fine axial feed, dog 58 is retained in T-slot 56 and dog 59 is removed.

Further, certain types of work may require but rough turning and may have no shoulders thereon. In such cases, the necessity for eliminating tool marks and for facing of shoulders is eliminated, and the time delay for such operation can be dispensed with to increase the productivity of the machine.

The facing phase of cycle operation can be eliminated by having plunger 51 in stop position (as is shown in Figure 2) and pulling plunger 79 of valve 77 into its leftmost position. This enables the spring 182 of valve 181 to move plunger 180 to the right, the entrapped fluid in the right-hand end of valve 181 flowing out to tank 96 as previously has been described in the description relating to the carriage return phase of the cycle.

When plunger 180 has assumed its rightmost position, cut-out valve 86 is manually closed to prevent any fluid from entering the right-hand end of valve 181 to tend to displace plunger 180 leftwardly. Port 201 of valve 181 now is connected directly to port 202 thereof; consequently, when high pressure fluid flows to move plunger 208 of valve 207 rightwardly to permit cutter head tripping, etc., it need not wait until spring 182 of valve 181 has moved plunger 180 rightwardly against the restricting action of facing time period adjustment valve 85, for plunger 180 already is in its rightmost position, valve 85 being, in effect, inoperative when cut-out valve 86 is closed.

Plunger 79 of valve 77 now is pushed back to its former rightmost position, and the machine is in condition to operate without employing a facing time period in the operating cycle thereof, everything being arranged as before except that plunger 180 is already in its rightmost position and that cut-out valve 86 is closed to prevent plunger 180 from being moved leftwardly.

Threading operation and threading cycle variations

Phase for phase, the operation of the machine during threading is the same as that during turning; consequently, there is no necessity for repeating the detailed operation of such phases. The following facts, however, should be noted.

First, since all threads require that the movement of the work and the rotation of the cutting tool be synchronized in a single definite relationship during the entire threading cut, it is not possible to employ more than one rate of axial feed of the carriage during the threading cut.

Secondly, since the coarse axial feed movement of the carriage is considerably faster than that generally desired to produce threads, the choice of axial feed should be restricted to the range of fine axial carriage feeds, that is, dog 59 should be removed from T-slot 56 and dog 58 should be utilized to actuate plunger 51.

Lastly, since the serrated cutters employed for threading have a spiral camming action with the threads that have been formed, it is impossible to have the carriage dwell for a facing operation, for this would result in stripping the threads off the work or ruining the cutters or both. Consequently, for threading operation, the machine must be conditioned to eliminate the facing phase of cycle operation.

Thus, threading operation of a machine dispenses with any facing and with any coarse and subsequently fine axial carriage travel. Further, it generally is restricted to fine axial carriage travel. However, the centering and chucking phase previously described may or may not be employed, depending on the character of the work.

In threading, it is possible to operate the machine in a manner which is different from any previously discussed. Since the serrated cutters eventually can have sufficient contact with the threaded work to draw carriage 16 toward cutter head 20 without having motor 45 serve for this purpose, it is possible to have the carriage 16 advance under the action of motor 45 only until the engagement between the formed threads and the serrated cutters is sufficient to effect further rightward carriage movement.

Figure 4 shows an arrangement of the dogs for effecting such operation of the machine, there being no work centering phase of cycle operation because dog 70 has been removed from T-slot 56 of carriage 16.

Now, after the operator depresses foot treadle 53 to start the cycle, the carriage is moved rapidly rightward until dog 58 presses plunger 51 to fine axial feed position. Motor 45 serves to move carriage 16 rightwardly at the fine axial feed rate until dog 57 presses plunger 51 to stop position. The high pressure fluid then is by-passed, as has previously been described, and further carriage movement toward cutter head 20 is effected by the engagement of the serrated cutters with the work.

Since piston 46 moves rightwardly along with carriage 16, the fluid in the right-hand end of motor 45 must be displaced to tank 96 in an unrestricted manner. Referring to Figure 2 which shows the circuit in stop position of the cycle, it can be noted that the fluid flows from part 116 through line 121 to port 119 of valve 120 and out port 124 thereof through lines 125, 126, and 174 to port 171 of valve 50 and out port 129 thereof through lines 130 and 131 to tank 96.

Continuing rightward movement of carriage 16 causes dog 76 to contact rocker 78 to effect leftward movement of plunger 79 of valve 77. The sequence of operation then continues as has previously been discussed; however, the time delay feature which effects the facing phase of operation is eliminated as has previously been mentioned and described.

Other embodiments

Obviously, any type of yoke actuated cutting tool may be mounted on the spindle of the machine in preference to the one disclosed, which, as has heretofore been mentioned, is of the same general character as that disclosed by Shearer in United States Patent 1,760,560 and which is primarily adapted for the external cutting of cylindrical surfaces or of conical surfaces whose length does not exceed that of the cutting faces of the cutters, whose cutting faces may be plain for turning and serrated for threading.

Other types of yoke actuated tools would include one of the character disclosed in United States application Serial No. 268,966, filed April 20, 1939, which would serve for essentially the same purposes as that shown by Shearer. Or for internal cutting of similar character, the one disclosed in United States application Serial No. 327,731, filed April 4, 1940, may be utilized. Such modifications merely would involve replacing the presently disclosed tool with either of those mentioned above.

Cutting tools of the type incorporating cutter tripping mechanisms therein, such as those disclosed in United States Patents 2,154,006 and 2,054,029 and in United States Patent application Serial No. 350,811, filed on even date herewith, may be mounted on the spindle of the machine. The tripping action of the yoke mechanism 26 would then be dispensed with by disconnecting piston 28 of motor 27 from the yoke mechanism, a suitable linkage being provided to permit piston 28 to press rod 91 rightwardly, member 90 of linkage 30 no longer being suitable for that purpose, for yoke mechanism 26 no longer would be actuated to rotate clockwise for cutter tripping movement.

With respect to these later mentioned tools, the one disclosed in United States Patent 2,154,006 would serve for essentially the same purposes as the one disclosed by Shearer. That disclosed in United States Patent 2,054,029 would serve for generating tapered (threaded or bored) internal surfaces. Also, that disclosed in United States Patent application Serial No. 350,811, filed on even date herewith would serve for generating tapered, (threaded or bored) external surfaces.

Likewise, it is to be understood that whether the work be clamped for non-rotary movement and the tool be rotated, or whether the work be rotated and the tool be stationary, is merely a matter of choice; for the carriage may be provided with a work rotating mechanism, and tool spindle 11 may be non-rotatably mounted in machine frame 10.

Further, the tool may be non-rotatably mounted on the carriage, and the work may be clamped in a rotatable yoke operated chuck mounted on spindle 11 and actuated by yoke mechanism 26.

Still further, the tool may be rotatably mounted on the carriage member, and the work may be clamped in a non-rotatable yoke operated chuck carried by spindle 11 which may be non-rotatably mounted in machine frame 10.

Since such and further embodiments may be effected, it is apparent that the construction of the machine, in this respect, is capable of a large degree of flexibility.

The machine further is adapted to thread or turn internal or external surfaces of straight or tapered configuration and having one or a plurality of progressively enlarged diameters. The tapered surfaces further may be generated. Work may be centered or chucked during a period of reduced forward movement of the carriage. The cutting can be effected at one rate or can be effected at some one rate and a subsequently different rate. Work may be faced and tool marks may be removed therefrom. All of these features are highly desirable and together with the other novel features of the machine, cause the machine to be practically universal in its application to threading or turning operations.

Further, the manner of supporting work for centering relationship is especially conducive to having the formed surfaces thereof be concentric therewith. The long length of the spring 41 assures having appreciably no undesirable build up of centering pressure as center 38 moves rightwardly within sleeve 36 during cutting operation. The adjustment 42 permits of initial adjustments of center 38, with respect to the cutter head 20, to particularly suit certain types and lengths of work.

Still further, the snap action of the rocker 78 and the detent 82 assures quick movement of plunger 79 to effect opening of the cutter head in an instantaneous fashion when the machine is in threading operation position. Thus, the engagement of the cutters with the work is terminated at the instant that the carriage travel stops, consequently, no injury, due to delayed opening of the cutters, can occur to either the formed threads or the cutting serrations.

While the schematic diagram shown in Figure 2 fully illustrates the manner in which the various valves, fluid motors, and other mechanisms are co-operatively combined, it should be understood that certain of these parts can be replaced by a plurality of standard valve structures, fluid motors, etc., which are combined to have equivalent operating characteristics.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a cutting machine, a structure mounted for rectilinear movement; a fluid motor connected to said structure and operable to move it from an initial position to a final position; a valve for reversing the fluid flow in said fluid motor; a fluid operated device for operating said valve; means automatically operable substantially when said structure attains said final position, for energizing said fluid operated device and causing said valve and fluid motor to return said structure toward initial position; and means for automatically actuating said valve to arrest said structure in initial position.

2. The machine defined in claim 1, wherein said last named means comprises a member having a lost-motion connection with said structure and adapted to be picked up by the latter slightly before it attains initial position.

3. In a cutting machine, a cutting device and a work holding device mounted for relative rotation and for relative axial movement; a fluid motor for moving one of said devices toward the other, so as to bring the work and said cutting device into cooperative relationship, said cutting device having release means for shifting it into non-cutting position; control means for automatically actuating said release means when said one device attains a predetermined position, and means, automatically actuated by said last named means for causing said fluid motor to return said one device to initial position.

4. The machine defined in claim 3, together with means for automatically actuating said release means so as to restore said cutting device to cutting condition when said one device attains initial position.

5. The machine defined in claim 3, wherein said control means comprises a quick-action valve, and a fluid motor connected to said release means, so that the latter will shift the cutting device into non-cutting position as soon as said one device attains said predetermined position.

6. The machine defined in claim 3, wherein said control means comprises a valve connecting a fluid operated device to a source of fluid energy, said fluid operated device being connected to said release means, and means for restricting the flow of fluid into said fluid operated device for delaying the release action of said cutting device until after said one device comes to rest.

7. A cutting machine comprising a rotary cutter and an axially movable carriage; a hydraulic motor connected to said carriage for moving said carriage in either direction said motor having a fluid inlet and a fluid outlet; a main control valve having a plurality of operative positions; a hydraulic system including connections between said valve and said motor; means supplying fluid under pressure to said system; a tank in said system for receiving discharged fluid; said system including a plurality of connections between the outlet of said hydraulic motor and said tank; adjustable valves restricting the flow through said last named connections; said main control valve being adapted in accordance to its position, to selectively direct the flow to one of said connections, and means actuated by the carriage in its movement to selectively position said main control valve.

8. A cutting machine comprising a rotary cutter and an axially movable carriage, a hydraulic motor for said carriage, said motor having a fluid inlet and a fluid outlet; a main control valve adapted to be actuated by the movement of said carriage for directing fluid to said inlet and regulating the rate of discharge from said outlet; means for reversing the fluid supply to said motor in response to the movement of said carriage and for positioning said control valve to stop the supply of fluid to said fluid inlet.

9. A combined turning and threading machine comprising a cutting element; a rotary head carrying said element; a movable center within said head; a movable work holding carriage in axial alignment with said head; and elongated spring for holding said center in engagement with work held by said carriage as said carriage moves toward said cutting element.

10. A combined turning and threading machine comprising a rotary cutting element; a head carrying said element; an axially movable carriage in alignment with said element; a centering means on said carriage; means for automatically imparting a relatively slow movement of said carriage toward said element to provide a work engaging and centering period, said means also providing a subsequent relatively rapid movement of said carriage toward said cutting element prior to engagement of said cutting element with the work and a spring pressed center axially movable within said head for engaging the work as it moves with said carriage.

11. In a cutting machine, a cutting device and a work holding device mounted for relative rotation and for relative axial movement; a fluid motor connected to one of said devices and adapted to move it at controlled speeds toward the other device and bringing the work and cutting device into cutting relationship; quick-action means, automatically actuated when said one device attains a predetermined position, for causing said cutting device to be released from the work and for causing said fluid motor to restore said one device to initial position, said quick-action means comprising a valve having a plunger which is rapidly displaced in actuated position by mutual quick-acting camming between a rocker member engaged by said plunger and a spring pressed detent mounted in said machine.

12. The machine defined in claim 1 wherein said last named means comprises a member carried by said structure.

13. The machine defined in claim 3, wherein said control means comprises a valve connecting a fluid operated device to a source of fluid energy, said fluid operated device being connected to said release means, and adjustable means for restricting the flow of fluid into said fluid operating device for delaying the release action of said cutting device until a predetermined period after said one device comes to rest.

14. A cutting machine comprising a rotary cutting tool and an axially movable carriage, a motor for imparting axial movement to said carriage, manual means for starting said motor, control means for said motor mounted to be actuated in response to movement of said carriage; means for driving said motor, in response to said control means, to provide a relatively slow movement of said carriage during a work chucking and/or centering period, a rapid movement of said carriage to cutting position, a plurality of relative axial movements of different speeds during a cutting phase, a period during which axial movement is stopped and a work facing operation is performed, and a final return movement of said carriage; and means automatically operated by the carriage for withdrawing the tool before the return movement of the carriage.

15. A cutting machine comprising a rotary cutting tool and an axially movable carriage; a motor for imparting an axial movement of said carriage to and from said tool; a control element for positioning said tool in cutting position; and means responsive to said carriage movement for withdrawing said tool, with a snap action at the end of said movement of the carriage toward said tool.

16. A cutting machine as described in claim 14 wherein an adjustable means is provided to retard the withdrawing of said tool whereby it forms an annular face on said work.

17. In a cutting machine, a work holding device comprising a pair of work supports disposed in spaced axial alignment and adapted to have a workpiece positioned therebetween; a carriage mounting one support for axial movement toward and away from the other support; and the latter being yieldingly movable in unison with said one support when a workpiece is positioned therebetween; a cutting device cooperating with said supports and operable to coact in cutting relationship with a workpiece carried thereby when the workpiece is moved into a predetermined axial position with respect to said cutting device; a power operated mechanism connected to one of said supports and operable to move it toward the other support; and control means, automatically operable in accordance with movement of said one support, for causing said mechanism to move said one support toward the other at a comparatively fast speed, until the spacing between said supports has been decreased to a distance slightly greater than the length of the workpiece to be operated upon, and to then automatically move said one support at a slower speed to permit a workpiece to be positioned between said supports, and to then move both of said supports and said workpiece in unison at a fast speed, to bring the workpiece rapidly into cutting relationship with said cutting device.

18. The cutting machine defined in claim 17, together with a second control means for causing said mechanism to automatically move said one support at a slower speed when said workpiece has been brought substantially into cutting relationship with said cutting device.

19. In a cutting machine, a cutting device and a work holding device mounted for relative rotation and for relative axial movement; a fluid motor connected to one of said devices and adapted to move it at controlled speeds toward the other device and bring the work and cutting device into cutting relationship; and quick-action means, automatically actuated when said one device attains a predetermined position, for causing said cutting device to be released from the work and for causing said fluid motor to restore said one device to initial position, said cutting device embodying a yoke actuated release, and said quick-action means comprising a second fluid motor operably connected to said yoke.

SAMUEL W. MATHIAS.